March 18, 1941. W. G. JONES, JR 2,235,485
GEAR SPEED REDUCER AND THE LIKE
Filed Jan. 17, 1940 3 Sheets-Sheet 2

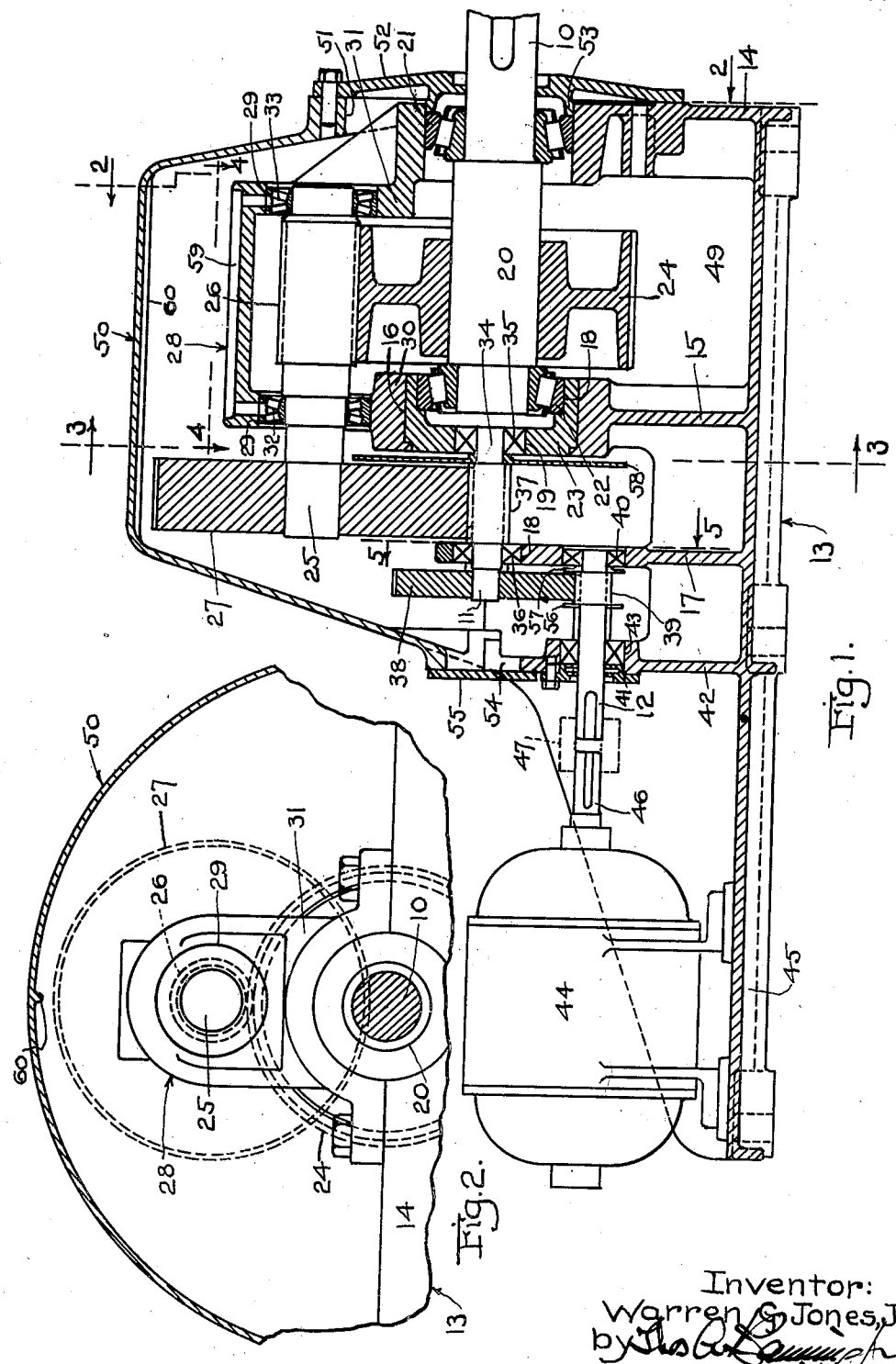

Inventor:
Warren G. Jones, Jr.,

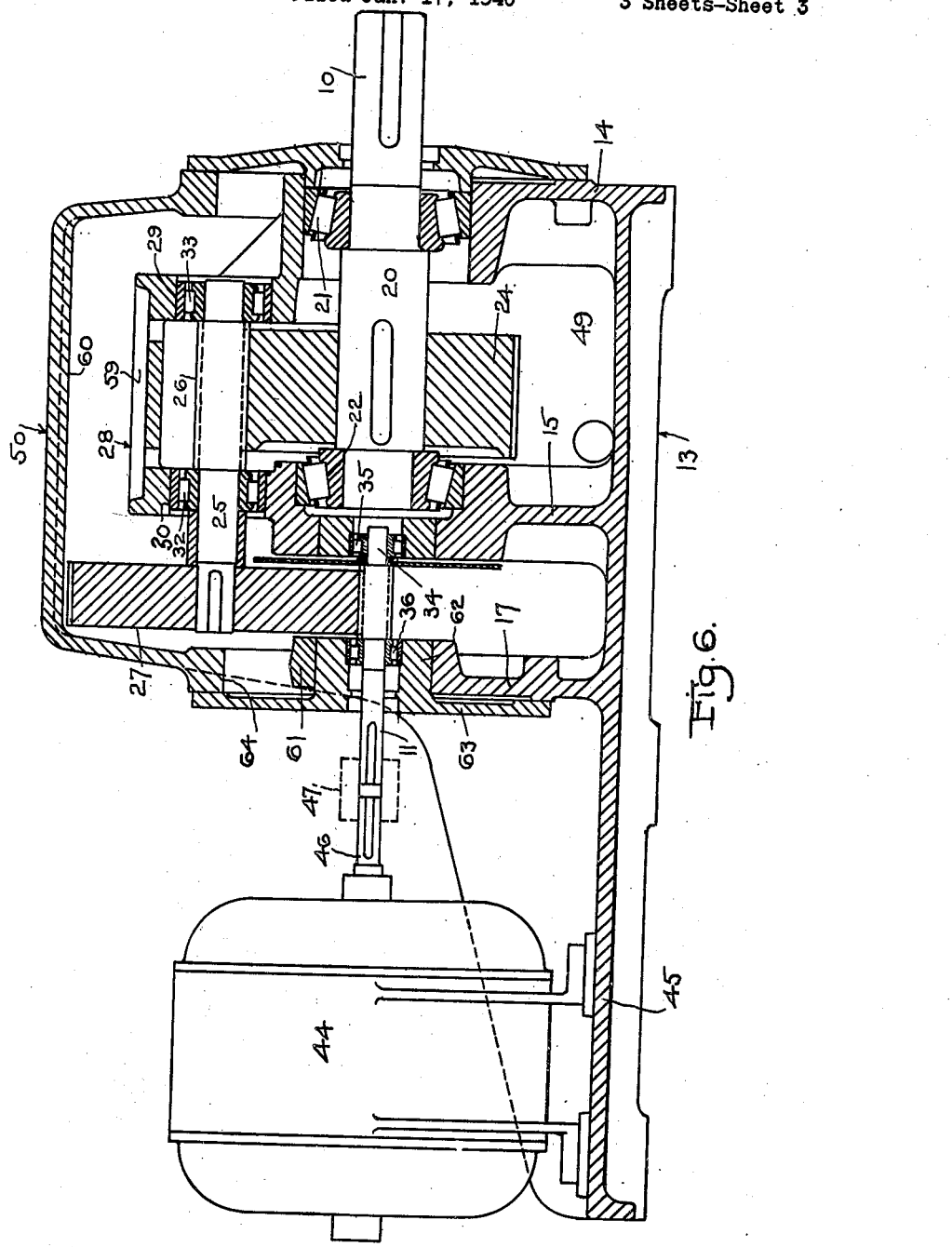

Patented Mar. 18, 1941

2,235,485

UNITED STATES PATENT OFFICE 2,235,485

GEAR SPEED REDUCER AND THE LIKE

Warren G. Jones, Jr., River Forest, Ill., assignor to W. A. Jones Foundry & Machine Co., Chicago, Ill., a corporation of Illinois Application January 17, 1940, Serial No. 314,202

9 Claims. (Cl. 74—421)

This invention has to do with improvements in gear speed changing devices, and the like. Generally such devices are used for reduction of speed, but manifestly they may also be used for increasing speed by proper connection of the driving and driven elements.

One feature of the invention has to do with improvements in design whereby the desired change of speed (generally reduction) may be secured with either two or three gear steps, and with a minimum amount of head room for gears capable of transmitting the intended power. In this connection the design and arrangements herein disclosed are such that proper supports are provided for the several shafts, and proper provision is made for receiving the various lateral thrusts of such shafts due to the very heavy tangential forces generated by transmission of large amounts of power at low speeds of rotation in the low speed end of the device.

A further feature of the invention relates to the provision of arrangements whereby one gear of the train (generally the low speed gear) may be locked against endwise shift, as by the use of thrust roller bearings, and such that the other gears of the train may then float into proper meshing positions, so that the most perfect meshing conditions under operation will be assured at all times. This will also result in continuous high life of the gears, very silent operation thereof, and increase of efficiency.

Sometimes it is desirable to make use of what are known as "double helical gears" or "herringbone gears," and when using such gears as the foregoing the previously mentioned feature will make it possible for the various gears of the train to come to their natural and most perfect meshing condition and to maintain such meshing condition at all times during the life of the device.

A further feature relates to an improved arrangement and design for supporting the various bearings for the several gear shafts. This feature has to do with a structural arrangement wherein the cover plate for enclosing the upper portion of the gear assembly is entirely distinct from the frame proper whereby the bearings are carried, so that the various gears and their bearings may be completely assembled together, and brought into proper adjustment prior to placement of the cover plate over the upper portion of the assembly, and while the upper portion of the device is open so that all interior parts may be readily reached and worked on. In this connection it is a further object of the invention to provide an arrangement whereby the low speed gear and shaft assembly may be directly carried by a permanent integral portion of the frame, and may be set initially into place therein; a suitable removable back gear and shaft assembly unit being provided as a distinct unit which may be set into place after the low speed gear and shaft unit has been so set into place and adjusted in the permanent portion of the frame structure. Sometimes the high speed gear and shaft assembly is also carried in a permanent portion of the frame, wherein it may be set and adjusted, so that when the said back gear and shaft assembly is thereafter set into place and adjusted it will be properly meshed and adjusted with respect to both the high and low speed gears aforesaid. In either case this back gear and shaft assembly, and the major portion of the frame therefor, constitute a distinct self-contained unit which may be set into place on the frame structure after the other gear and shaft assemblies have been set and adjusted into the permanent portion of the frame structure, and under the most advantageous conditions for such final adjustment. Sometimes, as in the case of a three stage speed reduction, there is provided an additional gear reducing set in the train, but even in such cases such back gear and shaft assembly must be brought into proper mesh and adjustment with the "high" and "low" speed gears with which it meshes, and the feature to which I have just been referring is applicable, and of great value.

When double helical or herringbone gears are used they must be brought into mesh by a lateral movement towards each other, as they cannot be endwise meshed. The back gear and shaft arrangement just above referred to makes it possible to secure such lateral bringing together of the intermeshing gears, both high and low speed, and without the need of other special provision for such meshing, so this back gear and shaft assembly arrangement makes it possible to use double helical or herringbone gears for this stage of the gear reduction, and under conditions heretofore not possible to attain. When the low speed gear and shaft assembly is locked against end play, and the said back gear and shaft assembly is so carried by its frame member that it may adjust itself endwise, it is possible to use such double helical or herringbone gears for both the "high" and "low" speeds, and for the intermeshing back gears, with assurance that these intermeshing gears will come immediately into the best operating conditions, and will maintain such operating conditions at all times.

A further feature of this back gear and shaft assembly and its frame part, is the provision of an improved means for assuring continuous and good lubrication of the parts. In this connection it is an object to provide means in such back gear frame part for catching or trapping oil thrown upwardly by various of the rapidly moving parts, and for thereafter permitting such oil to flow by gravity to various of the gears and bearings.

A further feature of the invention has to do with improvements in motorized units or gear reducers, wherein the driving motor is carried by a frame part or base constituting a permanent portion of the frame base. In this connection it is in object to provide the "high" speed gear shaft assembly as a portion of the gear reducer proper, with suitable provision for assembly and adjustment of the same, either when using plain spur gears or either single or double helical or herringbone gears, bringing such "high" speed gear shaft into alignment with the motor shaft, and suitably connecting these parts together by coupling or otherwise, as in the case of a continuation of the motor shaft as the said "high" speed gear shaft.

A further feature of the invention relates to the provision of an arrangement such that the entire structure may be made symmetrical at both sides of the longitudinal axis thereof. That is, to provide a balanced design. This is desirable from the standpoint of usability of the device for either right hand or left hand installation. At the same time, it is an object to secure this result in conjunction with the ability to bring the low speed shaft to a low position, and also in conjunction with the ability to bring the entire structure within a relatively low head room.

A further object of the invention is to provide an arrangement such that many of the parts may be made interchangeable for use in either the double or triple reduction arrangements, but still with the use of the various features hereinbefore set forth.

Other objects and uses of the invention will appear from a detailed description of the same, which consists in the features of construction and combinations of parts hereinafter described and claimed.

In the drawings:

Figure 1 shows a vertical longitudinal section through a typical three speed reduction device embodying the features of my present invention;

Figure 2 shows a fragmentary cross-section on the line 2—2 of Figure 1, looking in the direction of the arrows, and it shows in particular the form of the removable frame section for the back gear and shaft assembly;

Figure 6 shows a longitudinal section similar to that of Figure 1, but showing a double reduction form of structure, instead of the triple reduction form shown in Figure 1.

Figure 3:
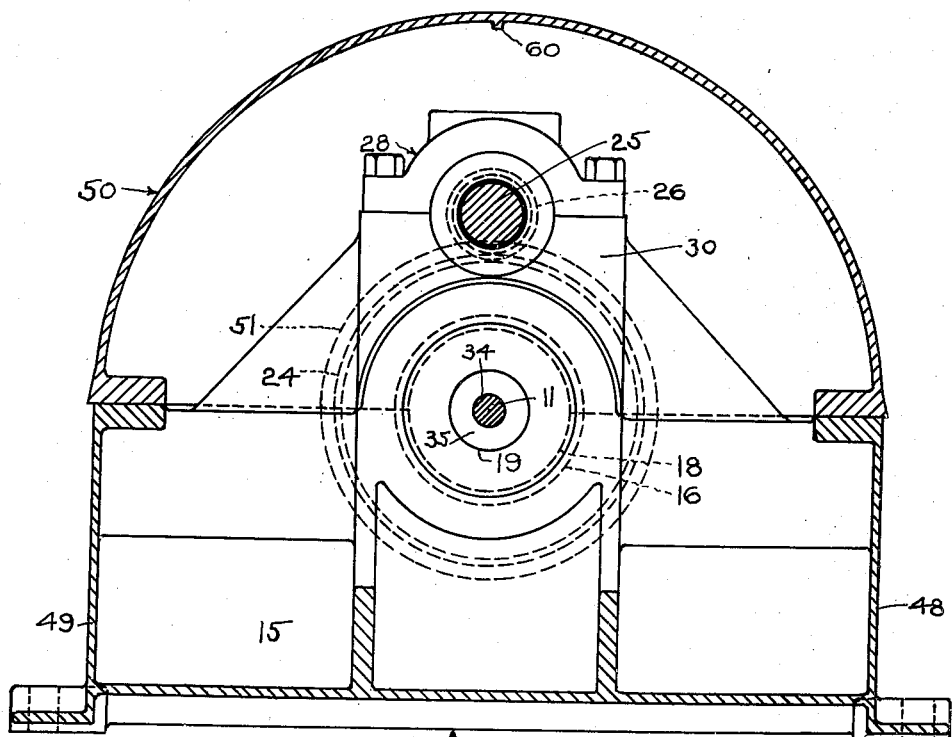
Figure 3 shows a cross-section on the line 3—3 of Figure 1, looking in the direction of the arrows.
Figures 4, 5:
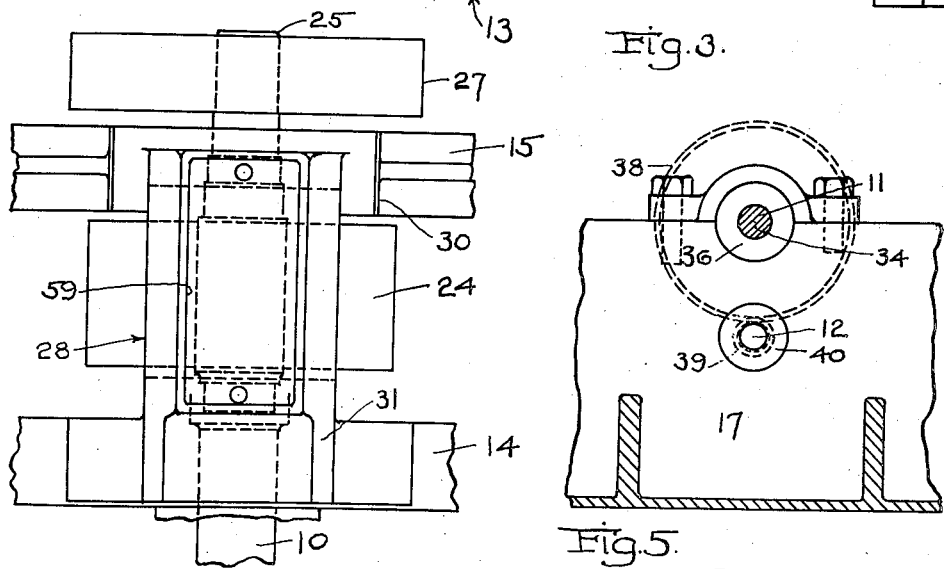
Figure 4 shows a fragmentary horizontal section on the line 4—4 of Figure 1, looking in the direction of the arrows, and it shows in particular the plan form of the removable frame section for the back gear and shaft assembly.
Figure 5 shows a fragmentary cross-section on the line 5—5 of Figure 1, looking in the direction of the arrows.

Referring first to the arrangement shown in Figures 1 to 5 inclusive, I have therein shown a triple reduction arrangement, and I have also shown the same as including the driving motor carried by the frame of the gear reducer, by mounting said motor on an extension of the base portion of said frame. Manifestly, other forms of drive may be used, either by motor or otherwise, and either with the motor supported independently of the gear reducer, or on the frame extension thereof, as herein illustrated.

The form shown in Figures 1 to 5 includes the shafts 10 and 11, preferably in alignment with each other, the shaft 10 being a "low" speed shaft, and the shaft 11 being a "high" speed shaft. As a matter of fact, in the form of Figures 1 to 5 there is also a shaft 12 by which the shaft 11 is driven, and which shaft 12 is of still higher speed than the shaft 11, the shaft 12 being driven by the driving motor, and the entire arrangement constituting a triple reduction of speed; but I prefer to designate the shafts 10 and 11 as "low" and "high" speed respectively since the features in respect to these portions of the structure are also applicable in the case of the modified double reduction form shown in Figure 6.

The frame of the reducer is designated by the numeral 13. It includes the back end stand 14, and the central stand 15. These stands are preferably integrally formed with the base proper, and are of great rigidity and strength to carry the heavy loads imposed by reason of journalling the low speed shaft assembly therein. Furthermore, the stand 14 is preferably split horizontally through the axis of the low speed shaft, but the stand 15 is not so split, but it is provided with a bored opening 16 for accommodation of the proper bearing or bearings. The structure shown in Figures 1 to 5 also includes a stand 17 closer to the driving end than the stand 15; and this stand 17 is provided with a bearing support at the point 18, preferably in alignment with the low speed shaft. The stand 15 has a bearing support at the point 19, also preferably in alignment with the low speed shaft, but independent of such low speed shaft and the bearings thereof.

The low speed shaft assembly includes the low speed shaft section 20 which is journalled in the locking or thrust roller bearings 21 and 22; and the said bearing 21 is seated in the semi-circular seat of the stand 14, and the said bearing 22 is seated in a liner 23 carried by the bored opening 16 of the stand 15. Of course the inner raceways of these bearings are set on the shaft 20, and the outer raceways of these bearings are properly locked in the manner well understood in the art.

The low speed gear 24 is properly carried by and secured to the shaft 20 to constitute a driven unit.

There is a back gear shaft 25, preferably directly above the low speed shaft and gear unit or assembly just referred to; and the shaft 25 carries, or has cut therein, the pinion element 26 to mesh with the low speed gear 24. This back gear shaft 25 also carries the end gear 27 by which it is driven. This back gear shaft and gear assembly is journalled in a removable frame element 28, said frame element 28 having at one end the bored opening 29 to receive the bearing for that end of the back gear shaft.

The stand 15 previously referred to has the upward extension 30, which terminates at the plane of the axis of the back gear shaft assembly, and provides a saddle for the lower half of the bearing for the other end of the back gear shaft assembly; and at that end the removable frame element 28 is provided with a companion upper half of the aforesaid bearing support for the back shaft and gear assembly. In other words, the removable frame element 28 is split horizontally with the uper end of the stand 15 in the plane of the axis of the back gear and shaft assembly, so that the bearing at the front end of the said assembly is carried in a split cage. The rear end of the removable frame element has the backwardly extending extension 31 which overreaches the upper end of the stand 14, and this over-reaching portion is semi-bored to provide, in conjunction with the upper end of the stand 14, suitable support for the bearing 21 at the back end of the low speed shaft. Thus, when the removable frame element is set and locked in place the bearing 21 is also locked. The bearings for the front and rear ends of the back shaft are designated as 32 and 33, respectively. It is preferred that these bearings 32 and 33 be of a construction to permit slight longitudinal shift of the back shaft and gear assembly, so that upon meshing the pinion 26 and the gear 24 these parts may come and remain in natural free meshing engagement.

The "high" speed shaft 34 is journalled in the opening 19 of the stand 15, or the liner 23 thereof, and also in the opening 18 of the stand 17. These bearings are designated as 35 and 36, respectively. They may be of suitable form, but preferably are of a construction permitting slight endwise adjustment of the shaft 34. Furthermore, the bearing opening 18 may be either a bored opening, or a split opening, but in either case the bearing 36 is carried thereby. This "high" speed shaft 34 carries or has formed therein, the pinion 37, meshing with the gear 27 of the back gear and shaft assembly.

In those cases in which the shaft 34 is directly driven by the motor or other source of power said shaft is the "highest" speed shaft; but in the arrangement of Figures 1 to 5 there is a further speed reduction in advance of this shaft 34. To this end said shaft 34 carries the gear 38; and there is a "highest" speed shaft 12 journalled beneath the shaft 34, and carrying the pinion 39 or having said pinion cut into it. This shaft 12 is thus journalled in a bearing 40 carried by the stand 17, and by a further bearing 41 carried by the front stand 42 of the main portion of the frame. These bearings may be suitable roller bearings or other forms, but preferably of such construction as to permit slight endwise adjustments so that the gear and pinion 38—39 will come to a natural free meshing engagement. The stand 42 may constitute in effect a portion of the front end wall of the housing for the gear reducer structure, or otherwise, and the opening 43 therein for accommodation of the bearing 41 may be either a bored opening, or a split opening, as desired.

When the "highest" speed shaft 12 is used, it is conveniently driven by a motor 44, carried by the frame extension 45, the motor shaft 46 being in alignment with the shaft 12, and connected thereto by a suitable coupling 47.

As previously suggested, the various gears and pinions may be of suitable form, but in many cases a double helical or herringbone type will be used. Such gears cannot be set together into proper mesh by endwise or sliding gear movement, but must be brought together by lateral movements. It is noted that with the arrangements herein disclosed the "high" speed assembly 34—38—37 may be set into place and its bearings adjusted, and the "low" speed assembly 24—20 may likewise be set into place and its bearings adjusted, while the removable frame element 28, together with the back gear and shaft assembly 28—25—27—26 is removed from the stands 15 and 14, the back gear bearings being suitably adjusted, if so desired, while so removed. Then, due to the fact that the extension 31 of the removable frame section is horizontally split with the stand 14, and the further fact that the front end of the removable frame section is also horizontally split with the upper end of the stand 15 (being the extension 30), it is possible to set this removable frame section directly down onto the stands 14 and 15 (the back gear shaft and gears being carried therewith during such movement), and thus the several gears and pinions are brought together laterally, and can be properly meshed even when using such double helical or herringbone gears. Since the bearings 32, 33, 35, 36, 40 and 41 are of a nature to permit of slight endwise adjustments during operation, they will permit the various gears and pinions to come together and run at all times under perfectly natural mesh, notwithstanding that the bearings 21 and 22 of the "low" speed shaft do not permit of any endwise shift of said shaft and its gear 24.

It is noted that the stands 14 and 42 constitute in effect end walls for the housing of the device, extending up from the base thereof. Nevertheless it is also noted that these end walls do not extend up beyond, or materially beyond, the elevations of the bearings 41 and 35. It is preferred that such end walls extend up to the elevation of the horizontal plane of the axis of the shafts 20 and 34 (or 11). Suitable side walls 48 and 49 are provided extending up from the base to this same elevation, so that a semi-height housing is thus provided integral with the base of the structure. In the absence of a cover plate for the housing the gears would be exposed. However, by this arrangement it is possible to make complete assembly of all the shaft and gear assemblies, placing the back gear and shaft assembly in place and bringing it to proper adjustment and mesh with the gear 24 and pinion 37, and from time to time such other adjustments or replacements may be made as may be required, all from above, the top of the structure being open.

To provide a suitable closure for the upper portion of the device I have provided the removable inverted pan shaped closure generally designated by the numeral 50. This closure has its lower edge lying in the horizontal plane of the axes of the shafts 20 and 34, and in contact with the upper edge of the semi-housing provided by the side and end walls aforesaid. Such top closure may be secured in place in any convenient manner, as by suitable tap screws or the like, in well understood manner.

It is noted that this removable closure is so formed at the back end that there is left a semi-circular opening 51 therein. This may be conveniently covered over by a removable plate 52, which is shown as being circular in form so as to reach down over the upper portion of the stand or end wall 14. Preferably such cover plate 52 has the central inwardly extending boss 53 which reaches into the outer end of the opening into which the bearing 21 is set. It is also noted that the stand or semi end wall 42 is provided with a circular opening 54 around the upper portion of the front bearing 41, and that a removable cover plate 55 is provided for this opening. These removable plates 52 and 55 provide means whereby access may be had to the end portions of the interior of the casing without having to remove the element 50 therefrom.

Lubrication is effectively provided for the various bearings and gears and pinions as follows:

Suitable oil may be placed in the lower housing section up to the desired elevation, for example, to a point slightly below the bearing 41, or even to the elevation of the shaft 12. Said shaft is provided with the oil slinger plates or rings 56 and 57, and due to the high speed of this shaft oil will be effectively taken up and thrown throughout the upper portion of the casing. There is likewise shown an oil slinger plate or ring 58 on the "high" speed shaft 34, and this is of relatively large diameter, so that it will reach down below the surface of the oil in the lower portion of the device, or pan. Due to the high peripheral velocity of this plate or ring 58 this oil, also, will be effectively thrown into the upper portion of the casing. Further oil will be taken directly by the low speed gear 24 which dips slightly into the oil bath.

The removable frame section 28 is preferably provided in its top portion with a shallow pan 59 which will catch oil so thrown up, and to improve such action the top of the removable cover section 50 may be provided with a longitudinally extending rib 60 from which oil will continuously drip and much of which will be effectively caught by the shallow pan 59 just referred to. Suitable holes may be drilled from this pan 59 to deliver oil to the bearings 32 and 33 and also directly down onto the pinion 26, so that all these parts will be effectively lubricated during running. Oil will also drip directly from the rib 60 onto the gear 27 to lubricate the same during running.

It is seen that I have provided, by the stands 14 and 15, a very rigid support for the "low" speed gear shaft and assembly, which is especially important due to the large pressures exerted on the low speed gear. Furthermore, that by supporting the removable frame section 28 directly from these stands I have provided a very rigid support for this removable section, and a support which is entirely independent of the bearings 21 and 22 whereby the "low" speed shaft and gear assembly is carried. This, likewise, is very important due to the large forces exerted by the gear 27 and pinion 26. Nevertheless, such removable section 28, together with the back gear and shaft thereof may be readily removed or set into place, and without disturbance to the other operating parts.

The arrangement shown in Figure 6 is similar to that described for Figures 1 to 5, but it eliminates the third gear reduction so that the motor or other driving element drives the shaft 34 (or 11) directly. For this purpose the stand 17 becomes in effect the front end of the device, and the stand or wall 42, together with the shaft 12, gear 38, pinion 39, and bearings 40 and 41, are eliminated. Accordingly, the length of the device is correspondingly lessened, but the elevation of the shaft to be driven by the motor or other source of power is raised, being the elevation of the shaft 34 (or 11) instead of that of the shaft 12. The triple reduction unit of Figures 1 to 5 will always have a higher gear ratio than the double type of Figure 6. It therefore follows that for corresponding sizes of triple and double reduction units, the double type will transmit more horsepower at a given input speed than the triple type. Thus the motors of the double type would generally be larger than those of the triple type.

It may also be noted in respect to the arrangement of Figure 6 that the stand 17 (constituting in this case a portion of the high speed or front end wall of the structure), is split horizontally on the plane of the axis of the shaft 34 (or 11), so that a cap 61 may be set over and secured thereto, and the bearing 36 is, in this case, set into the boss 62 of a cover plate 63. Said cover plate overlies the opening 64 around the upper half of the bearing, and the removable cover section 50 comes down into engagement with such plate 63 so as to complete the enclosure of the device. It is noted that the arrangement of Figure 6 is in all essential respects the same as that of Figures 1 to 5 with the exception of the elimination of the highest speed shaft and its gears.

While I have herein shown and described only certain embodiments of the features of my present invention, still I do not intend to limit myself thereto, except as I may do so in the claims to follow.

I claim:

1. In a device of the class described, the combination of a base section having a pair of upwardly extending stands, a "low" speed shaft journalled in said stands, a gear on said shaft, a third stand upwardly extending from said base section in advance of said first mentioned stands, a "high" speed shaft journalled in said last named stand and one of the first mentioned stands, a removable frame section, a back shaft journalled therein parallel to the "low" and "high" speed shafts and said back shaft having at least one of its journals exclusively in said removable frame section, means to support said removable frame section rigidly with respect to both of the first mentioned stands, a pinion on the "high" speed shaft, and a pinion and a gear on the back shaft meshing with the gear and the pinion of the "low" and "high" speed shafts, respectively, substantially as described.

2. In a device of the class described, the combination of a base section having three upwardly extending stands in alignment with each other, a "high" speed shaft journalled in one end stand and the intermediate stand, and a "low" speed shaft journalled in alignment with the "high" speed shaft and having journals in the intermediate stand and the other end stand, a pinion on the "high" speed shaft and a gear on the "low" speed shaft, a removable frame section having a backward extension thereof constituting a top portion of the journal housing for the "low" speed shaft journal in the back end stand, means to secure said removable frame section rigidly with respect to the said back end stand and the intermediate stand, a back shaft journalled in said removable frame section and said back shaft having at least one of its journals exclusively in said removable frame section, and a gear and a pinion on said back shaft meshing with the pinion of the "high" speed shaft and the gear of the "low" speed shaft, respectively, substantially as described.

3. In a device of the class described, the combination of a base section having three upwardly extending stands in alignment with each other, a "high" speed shaft journalled in one end stand and the intermediate stand, and a "low" speed shaft journalled in alignment with the "high" speed shaft and having journals in the intermediate stand and the other end stand, a pinion on the "high" speed shaft and a gear on the "low" speed shaft, a removable frame section having one portion thereof constituting a top portion of the journal housing for the "low" speed shaft journal in the back end stand, means to secure said removable frame section rigidly with respect to said back end stand and the intermediate stand, a back shaft journalled in said removable frame section and said back shaft having at least one of its journals exclusively in said removable frame section, and a gear and a pinion on said back shaft meshing with the pinion of the "high" speed shaft and the gear of the "low" speed shaft, respectively, substantially as described.

4. In a device of the class described, the combination of a base section having three upwardly extending stands in alignment with each other, a "high" speed shaft journalled in one end stand and the intermediate stand, and a "low" speed shaft journalled in the intermediate stand and the other end stand, a pinion on the "high" speed shaft and a gear on the "low" speed shaft, a removable frame section, means to secure said removable frame section rigidly with respect to the intermediate stand and the last mentioned end stand, a back shaft journalled in said removable frame section and said back shaft having at least one of its journals exclusively in said removable frame section, a gear on said back shaft meshing with the pinion of the "high" speed shaft, and a pinion on said back shaft meshing with the gear of the "low" speed shaft, substantially as described.

5. In a device of the class described, the combination of a base section having three upwardly extending stands in alignment with each other, "high" speed shaft journals in one end stand and the intermediate stand, a "high" speed shaft in said journals, "low" speed shaft journals in the intermediate stand and the other end stand, a "low" speed shaft journalled in said journals, semi-housing walls in conjunction with the end stands and the base section to provide an oil pan substantially to the elevation of the journals aforesaid, a removable frame section above the intermediate stand and the last mentioned end stand, means to secure said removable frame section rigidly with respect to said stands, a back shaft journalled in said removable frame section, a gear on the "low" speed shaft, a pinion on the "high" speed shaft, a gear and a pinion on the back shaft meshing with the pinion of the "high" speed shaft and the gear of the "low" speed shaft, respectively, an oil pan on the upper portion of the removable frame section, oil slingers on the "high" and the "low" speed shafts, a removable cover overlying all said parts and adapted in conjunction with said semi-housing walls to provide an enclosure for said parts, there being oil passages from the oil pan of the removable frame section to the journals thereof, substantially as described.

6. In a device of the class described, the combination of a base section having three upwardly extending stands in alignment with each other, "high" speed shaft journals in one end stand and the intermediate stand, a "high" speed shaft in said journals, "low" speed shaft journals in the intermediate stand and the other end stand, a "low" speed shaft journalled in said journals, semi-housing walls in conjunction with the end stands and the base section to provide an oil pan substantially to the elevation of the journals aforesaid, a removable frame section above the intermediate stand and the last mentioned end stand, means to secure said removable frame section rigidly with respect to said stands, a back shaft journalled in said removable frame section, a gear on the "low" speed shaft, a pinion on the "high" speed shaft, a gear and a pinion on the back shaft meshing with the pinion of the "high" speed shaft and with the gear of the "low" speed shaft, respectively, and a removable cover overlying all said parts and adapted in conjunction with said semi-housing walls to provide an enclosure for said parts, whereby the journals for all said shafts are mounted and supported entirely independently of said removable cover, substantially as described.

7. In a device of the class described, the combination of a base section having three upwardly extending stands in alignment with each other, "high" speed shaft journals in one end stand and the intermediate stand, a "high" speed shaft journalled in said journals, "low" speed shaft journals in the intermediate stand and the other of the end stands, a "low" speed shaft journalled in said journals, a removable frame section above the intermediate stand and the last named end stand, means to secure said removable frame section rigidly with respect to said stands, a back shaft journalled in said removable frame section, a gear on the "low" speed shaft, a pinion on the "high" speed shaft, a gear and a pinion on the back shaft meshing with the pinion of the "high" speed shaft and the gear of the "low" speed shaft, respectively, together with a removable cover section serving in conjunction with the base section to provide an enclosure for said parts, all said journals and shafts being supported by the stands independently of said removable cover section, substantially as described.

8. In a device of the class described, the combination of a base section having three upwardly extending stands in alignment with each other, suitable journals in said stands in alignment with each other and at a relatively low elevation, for accommodation of a "high" speed shaft and a "low" speed shaft in alignment with each other, "high" and "low" speed shafts journalled in said journals, a pinion on the 'high" speed shaft and a gear on the "low" speed shaft, a removable frame section directly above the stands and shafts therein, means to secure said removable frame section rigidly with respect to the intermediate stand and the "low" speed shaft journal stand, a back shaft journalled in the removable frame section and said back shaft having at least one of its journals exclusively in said removable frame section, a gear on the back shaft meshing with the pinion of the "high" speed shaft, and a pinion on the back shaft meshing with the gear of the "low" speed shaft, whereby said back shaft and gear unit is rigidly supported by the stands of the base section, and whereby said unit is removable from and attachable to the stands as a complete unit and by lateral movements of its shaft and gear and pinion as distinguished from endwise movements thereof, substantially as described.

9. In a device of the class described, the combination of a base section having three upwardly extending stands in alignment with each other, suitable journals in said stands in alignment with each other and at a relatively low elevation, for accommodation of a "high" speed shaft and a "low" speed shaft in alignment with each other, "high" and 'low" speed shafts journalled in said journals, a pinion on the 'high" speed shaft and a gear on the "low" speed shaft, a removable frame section directly above the "low" speed shaft, means to secure said removable frame section rigidly with respect to the stands wherein the "low" speed shaft is journalled, a back shaft journalled in said removable frame section and said back shaft having at least one of its journals exclusively in said removable frame section, a gear on said back shaft meshing with the pinion of the "high" speed shaft, and a pinion on said back shaft meshing with the gear of the "low" speed shaft, whereby the shafts, and the gears and pinions, and the stands are all symmetrical about a vertical longitudinally extending plane, substantially as described.

WARREN G. JONES, Jr.